United States Patent [19]

Koyama et al.

[11] Patent Number: 5,331,354
[45] Date of Patent: Jul. 19, 1994

[54] POWER SUPPLY APPARATUS FOR TELEVISION RECEIVER SET AND TELEVISION RECEIVER SET INCLUDING THE SAME

[75] Inventors: Takeo Koyama; Takashi Nakano, both of Osaka, Japan

[73] Assignee: Matsushita Electric Industrial Co., Ltd., Osaka, Japan

[21] Appl. No.: 765,345

[22] Filed: Sep. 25, 1991

[30] Foreign Application Priority Data

Sep. 26, 1990 [JP] Japan ................................. 2-258001
Nov. 5, 1990 [JP] Japan ................................. 2-300801

[51] Int. Cl.⁵ .......................... H04N 5/63; H04N 7/20
[52] U.S. Cl. ................................. 348/730; 348/706; 455/3.2; 455/343
[58] Field of Search .................... 358/181, 190, 189; 455/127, 343, 3.2; 363/21; 315/411; H04N 5/63, 7/20

[56] References Cited

U.S. PATENT DOCUMENTS

| | | | |
|---|---|---|---|
| 4,631,654 | 12/1986 | Houee et al. | 363/21 |
| 4,731,869 | 3/1988 | Farrer | 455/127 |
| 4,731,870 | 3/1988 | Black et al. | 455/127 |
| 4,751,580 | 6/1988 | Fitzgerald et al. | 358/190 |
| 4,862,290 | 8/1989 | Jung et al. | 358/190 |
| 4,903,130 | 2/1990 | Kitagawa et al. | 358/181 |
| 5,036,261 | 7/1991 | Testin | 358/190 |
| 5,134,486 | 7/1992 | Suzuki et al. | 455/343 |
| 5,168,436 | 12/1992 | Barlage | 363/21 |

FOREIGN PATENT DOCUMENTS

| | | | |
|---|---|---|---|
| 0300193 | 1/1989 | European Pat. Off. | H04N 7/20 |
| 0359323 | 3/1990 | European Pat. Off. | |
| 58-121876 | 7/1983 | Japan . | |
| 0008674 | 1/1987 | Japan | H04N 5/63 |
| 1245772 | 9/1989 | Japan . | |
| 0302184 | 12/1990 | Japan | H04N 5/46 |

Primary Examiner—Mark R. Powell
Assistant Examiner—Jeffrey S. Murrell
Attorney, Agent, or Firm—Lowe, Price, LeBlanc & Becker

[57] ABSTRACT

A power supply apparatus for the television receiver set comprising a television receiving circuit and other receiving circuits, for example, satellite broadcasting receiving circuit or character broadcasting receiving circuit, each of receiving circuit is supplied with a supply power from the same switching power supply of regenerative type having plural secondary windings wherein some receivers are selectively turned off by switches provided the receivers and the switching power supply for automatic recording or standby mode. The regenerative type of switching power supply has a stable output characteristic over a range from no load to the maximum load because of regenerative operation. The horizontal scanning circuit is turned off by the switch. This causes the horizontal scanning circuit and vertical scanning and video signal processing circuits to stop operation because supply power of the vertical scanning and video processing circuits are supplied with power from tile horizontal scanning circuit through a high voltage generation circuit. The television having satellite broadcasting circuit and such power supply apparatus is also disclosed.

21 Claims, 9 Drawing Sheets

POWER SUPPLY APPARATUS FOR TELEVISION RECEIVER SET AND TELEVISION RECEIVER SET INCLUDING THE SAME

BACKGROUND OF THE INVENTION

1. Field of the Invention

This invention relates to a power supply apparatus for television receiver set and television receiver set including the same and particularly to a power supply apparatus for television receiver set having satellite broadcasting or character broadcasting receiver and the television receiver set including the same.

2. Description of the Prior Art

Recently, some television receiver sets have contained a satellite broadcasting receiver or a character broadcasting receiver where each of these functions can be performed separately. In the television receiver set with such multi-function, individual operation among these functions is enabled by that one power supply apparatus is provided for one function because there is necessity of selectively operating these function for automatic recording by VTR, etc.

Hereinbelow will be described a prior art television receiver set including such a prior art power supply apparatus.

FIG. 9 is a block diagram of the prior art television receiver set having the prior art power supply apparatus. In FIG. 9, numeral 1 is an ac power supply input terminal; numeral 2 is a main switch for manually turning off all power supplies of the television receiver set; numeral 4 is a relay switch turned on/off in response to a control signal 3 from a microprocessor 100; numeral 6 is a relay switch which is turned on/off by a control signal 5 also sent from the microprocessor 100 for causing the television receiver set to enter an automatic recording condition wherein only the power supply for the television portion is turned off but a satellite broadcasting receiving circuit 24 is operated; numeral 7 is a line filter; numeral 8 is a rectifying circuit of a switching power supply 10 for the television portions, which rectifies and smooths an ac input voltage; numeral 9 is a rectifying circuit of a switching power supply 11 for the satellite broadcasting receiving circuit 24; numeral 12 is a remote control transformer for supplying a standby supply power for the microprocessor 100; numeral 13 is a rectifying circuit for the standby supply power; numeral 14 is a high voltage generation circuit having a flyback transformer (not shown); numeral 15 is a horizontal scanning circuit for horizontally scanning an electron beam; numeral 16 is a flyback pulse from the horizontal scanning circuit 15; numeral 17 is a supply voltage for the high voltage generation circuit 14 and the horizontal scanning circuit 15; numeral 18 is a vertical scanning circuit for vertically scanning the electron beam; numeral 19 is a supply voltage of the vertical scanning circuit 18; numeral 20 is a video signal processing circuit for converting an RF signal to an RGB signal to reproduce an image on a braun tube (not shown); numeral 21 is a supply voltage for the video signal processing circuit 20; numeral 22 is a voice signal output circuit comprising an amplifier, etc.; numeral 23 is a supply voltage of the voice signal output circuit 22; numeral 24 is the satellite broadcasting circuit for receiving a BS-IF signal; and numeral 25 are plural supply voltages for the satellite broadcasting receiving circuit 24. Moreover, supply voltages 17, 19, 21, and 23 are outputted to respective circuits from the switching power supply 10 and the supply voltage 25 is outputted from the switching power supply 11.

Hereinbelow will be described operation of power supply apparatus for the television receiver set having the above-mentioned structure.

At first, a condition that a picture image is displayed with all circuits being activated will be described. When the main switch 2 is closed, an ac voltage is supplied to the remote control transformer 12 from the ac power supply input 1, so that a standby supply power is generated in the rectifying circuit 13 of the secondary circuit. This power supplying starts operation of the microprocessor 100. If a user has selected watching of the television, the control signals 3 and 5 from the microprocessor 100 are so outputted to close both relay switches 4 and 6. The supply voltages are produced as follows:

The ac voltage from the ac input terminal 1 is passed through a line filter 7 and is rectified by the rectifying circuit 8 is supplied to the switching power supply 10. In the similar way, the supply voltage from the rectifying portion circuit 9 is supplied to the switching power supply 11. Then, both power supplies 10 and 11 start oscillation. The switching power supply 10 supplies the supply voltage 17, the supply voltage 19, the supply voltage 21, and the supply voltage 23 to the horizontal scanning circuit 15, the vertical scanning circuit 18, the video signal processing circuit 20, and the video signal output circuit 22 of secondary loads respectively as shown in FIG. 9. In the similar way, the switching power supply 11 supplies the supply voltage 25 to the satellite broadcasting receiving circuit 24. Thus, all circuits in the television for displaying image pictures and outputting voice sounds, so that the television receiver set is in a condition that the user can selected to which a programs of the ordinal television broadcasting or the satellite broadcasting is watched at will.

Hereinbelow will be described an automatic recording of a program of the satellite broadcasting which is carried out from the above-mentioned condition. That is, the following describes the operation of the television receiver set when the user desires to record a program by a video recorder (not shown) during his absence. This function is carried out under the condition that power supplying to the circuits of the television portion is stopped but only the satellite broadcasting receiving circuit is operated.

When the user gives the television a command for automatic recording by a remote controller (not shown) or by a keyboard on the front of the television (not shown), in response to the command, the microprocessor outputs the control signal 5 so as to open the relay switch 6. Then, the switching power supply 10 stops operation because the supply voltage is not supplied thereto through the line filter 7 and the rectifying circuit portion 8. Thus, picture images are not displayed on the screen of the television receiver set because each circuit as its secondary load does not operate. In this condition the main switch 2 and relay switch 4 remain close, so that the switching power supply 11 remains in operation and the satellite broadcasting receiving circuit 24 is in a condition of automatic recording wherein it maintains its operation with a given broadcasting selected.

However, in the above-mentioned structure, there is a drawback that the cost is high because an area for mounting elements is large since there are two sets of a line filter, a rectifying circuit, and a switching supply for both the television and the satellite broadcasting portion. In addition to this, there is also another drawback that a power supply for the microprocessor is separately necessary.

SUMMARY OF THE INVENTION

The present invention has been developed in order to remove the above-described drawbacks inherent to the conventional power supply apparatus for the television receiver set and the conventional television receiver set having such power supply apparatus.

In consideration of the above-mentioned drawback, the invention provides a small-sized power supply apparatus for the television receiver set capable of automatic recording operation of the satellite broadcasting with one switching power supply.

In order to resolve the above-mentioned drawback, there is provided the power supply apparatus for the television receiver set of the invention wherein the supply power to the horizontal scanning circuit is controlled by a switch provided between the switching power supply and the horizontal scanning circuit as well as the supply voltage of the vertical scanning circuit and the video signal processing circuit are supplied from the secondary circuit of the flyback transformer of the high voltage generation circuit.

According to the present invention there is provided a power supply apparatus for a television receiver set including a television circuit portion and a broadcasting receiving circuit portion for receiving broadcasting whose type is different from that of the television circuit portion, comprising: a regenerative type of switching power supply for producing a plurality of supply voltages whose intensities are different from each other; and a switch circuit for controlling of supplying of a first supply voltage out of the supply voltages to the television circuit portion in response to a control signal, wherein the broadcasting receiving circuit portion comprises a satellite broadcasting receiving circuit and a second supply voltage out of the supply voltages is supplied to the satellite broadcasting receiving circuit.

According to the present invention there is also provided a power supply apparatus for a television receiver set as mentioned above, further comprising second switching circuit and, wherein: the broadcasting receiving circuit portion further comprises character broadcasting receiving circuit; a third supply voltage out of the supply voltages is supplied to the character broadcasting receiving circuit; and the second switching circuit controls supplying of the third supply voltage to the character broadcasting receiving circuit in response to a second control signal.

According to the present invention there is also provided a power supply apparatus for a television receiver set including a television circuit portion and broadcasting receiving circuit portion for receiving broadcasting whose type is different from that of the television circuit portion, comprising: a regenerative type of switching power supply for producing a plurality of supply voltages whose intensities are different from each other, a first supply voltage being supplied to the television circuit portion, a second supply voltage being supplied to the broadcasting circuit portion; and a control circuit for controlling of supplying of each of the first and second supply voltages in accordance with an external command signal.

According to the present invention there is further provided a television receiver set having a television circuit portion and a broadcasting receiving circuit portion for receiving broadcasting whose type is different from that of the television circuit portion, comprising: a regenerative type of switching power supply for producing a plurality of supply voltages whose intensities are different from each other, a first supply voltage being supplied to the television circuit portion, a second supply voltage being supplied to the broadcasting circuit portion; and a control circuit for controlling of supplying of each of the first and second supply voltages in accordance with a control signal, wherein the television circuit portion comprises a horizontal scanning circuit and the first supply voltage is supplied to the horizontal scanning circuit.

According to the present invention there is further provided a television receiver set having a television circuit portion and broadcasting receiving circuit portion for receiving broadcasting whose type is different from that of the television circuit portion, comprising: a regenerative type of switching power supply for producing a plurality of supply voltages, a first supply voltage out of the supply voltages being supplied to the television circuit portion, a second supply voltage out of the supply voltages being supplied to the broadcasting circuit portion; and a controller for controlling of supplying of each of the first and second supply voltages in accordance with a control signal, wherein the television circuit portion comprises: a video signal processing circuit; a vertical scanning circuit, a horizontal scanning circuit; and a voltage generation circuit responsive to the horizontal scanning circuit for producing a first voltage supplied to the vertical scanning circuit and second voltage supplied to the video processing circuit, and the first supply voltage is supplied to the horizontal scanning circuit.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Figure 1:
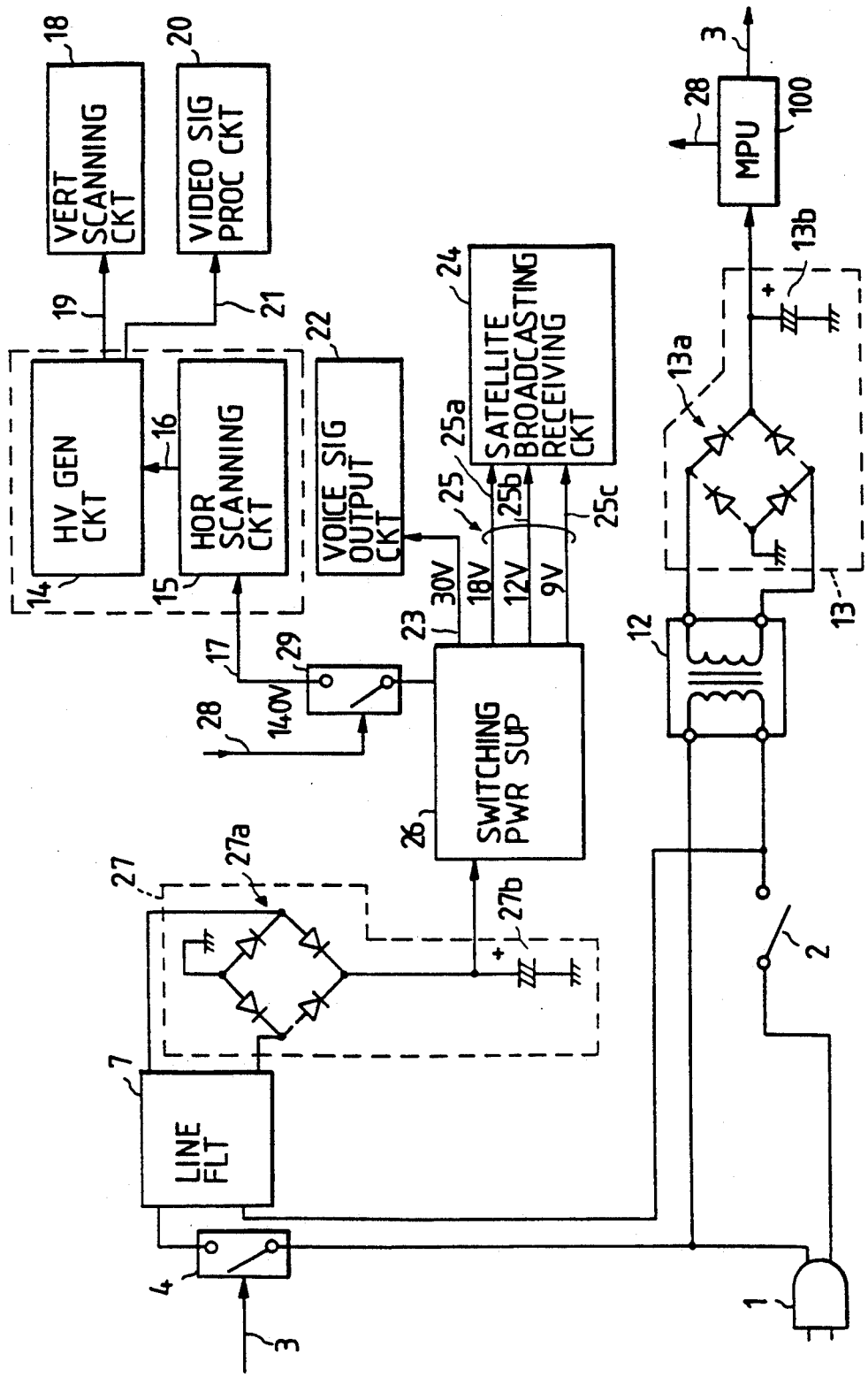
FIG. 1 is a block diagram of a first embodiment of the invention of a television receiver set including a regenerative type of power supply.

Hereinbelow will be described a first embodiment of invention with reference to drawings. FIG. 1 is a block diagram of the first embodiment of the power supply apparatus for the television receiver set and the television receiver set having the power supply apparatus.

Figure 9:
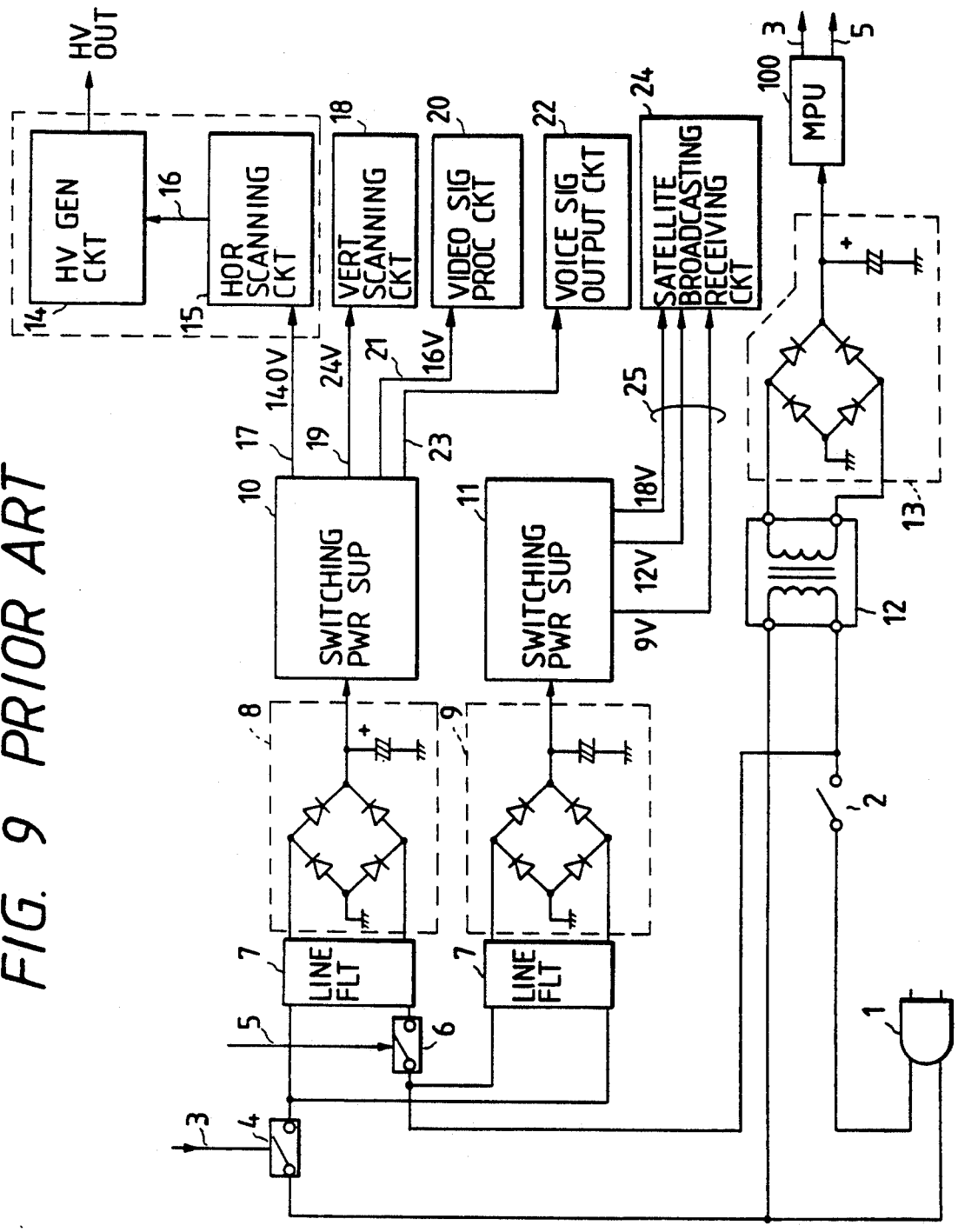
FIG. 9 is a block diagram of the prior art television receiver set having the prior art power supply apparatus.

In FIG. 1, an ac power supply input terminal 1 receives an ac supply power and sends it to a remote control transformer through a main switch 2 and to a line filter 7 through the main switch 2 and a relay switch 4. The main switch 2 turns off all supply power of the television receiver set. The relay switch 4 is made close or open in response to a control signal 3 from a microprocessor 100. The remote control transformer 12 supplies an ac supply power with a desired voltage to a rectifying circuit 13 comprising a rectifying bridge 13 and a smooth capacitor 13b. An output of the rectifying circuit 13 is sent to the microprocessor 100. The line filter 7 supplies the ac supply power with noise components removed to a rectifying circuit 27 comprising a rectifying bridge 27a and a smoothing capacitor 27b of electrolytic capacitor wherein diodes of the rectifying bridge and the capacitor have larger capacitances than those of the prior art shown in FIG. 9 respectively. An output of the rectifying circuit 27 is sent to a regenerative type of switching power supply 26. The switching power supply 26 generates and sends a dc supply voltage 17 to a horizontal scanning circuit 21 through a relay switch 29, a set of dc supply voltages 25 to a satellite broadcasting receiving circuit 24 directly, and a supply voltage 23 to a voice signal output circuit 22 also directly. For example, the set of the dc supply voltages include a first supply voltage 25a of 18 volts, a second supply voltage 25b of 12 volts, and a third supply voltage 25c of 9 volts. The microprocessor 100 produces a control signal 28 which is applied to the relay switch 29 for causing the television receiver set to enter the automatic recording condition. That is, the relay switch 29 is turned on/off by the control signal 28 from the microprocessor 100 and is provided between the switching power supply 26 and the horizontal scanning circuit 15. The horizontal scanning circuit 16 generates flyback pulses 16 which is sent to a high voltage generation circuit 14. The high voltage generation circuit 14 produces a high voltage supply voltage 19 which is sent to a vertical scanning circuit 18 and another high voltage supply voltage 21 is sent to a video signal processing circuit 20.

Operation of the television receiver set and the power supply apparatus included therein having the above-mentioned structure will be described with reference to FIG. 1.

At, first, will be described a condition that all circuits are operated and tile television receiver set displays pictures. When the main switch 2 is closed, the ac supply voltage is supplied to the primary circuit of the remote control transformer 12 from the ac power supply input terminal 1. Thus, the standby supply power is developed at the secondary circuit of the rectifying circuit 13, so that the microprocessor 100 is supplied with the standby supply power and starts operation. In this condition, if the user of the television receiver set selects watching the television receiver set, the control signals 3 and 28 are so produced as to close both relay switches 4 and 29. Then, the rectified supply power is supplied to the switching power supply 26. The supply voltages are produced as follows:

The ac voltage from the ac input terminal 1 is passed through a line filter 7 and is rectified by the rectifying circuit 27. The switching power supply 26 starts oscillation and outputs voltages at its secondary circuit. Then, the switching power supply 26 supplies the supply voltage 17, the supply voltage 23, and the set of supply voltages 25 to the horizontal scanning circuit 15, the voice signal output circuit 22, and the satellite broadcasting receiving circuit 24 respectively as shown in FIG. 1. Thus, all circuits in the television for displaying image pictures and outputting voice sounds operate, so that the television receiver set is in a condition that the user can watch programs of the ordinal television broadcasting and the satellite broadcasting at will.

From the above-mentioned condition, an automatic recording mode for recording a program of the satellite broadcasting automatically will be described. The meaning of the automatic recording mode is the same as that of the prior art mentioned above, so that detailed description is omitted.

When the user sends to the television receiver set a command for automatic recording by a remote controller (not shown) or by a keyboard (not shown) on the front of the television receiver set, in response to the command, the microprocessor 100 outputs the control signal 28 so as to open the relay switch 29. Then, the switching power supply 26 continues operation and output of each of supply powers. However, the supply voltage 17 is not supplied to the horizontal scanning circuit 15, so that the flyback pulse 16 is not generated and the high voltage generation circuit 14 stops operation. This causes that the supply voltages 19 and 21 are not supplied to the vertical scanning circuit 18 and the video signal processing circuit 20 from the secondary circuit of the flyback transformer to the high voltage generation circuit 14 respectively. This condition is the same as the condition that the prior art switching power supply 10 is not in operation shown in FIG. 9 because all circuits for display, that is, television circuit portion, are not in operation. Therefore, this establishes the automatic recording condition that only the satellite broadcasting receiving circuit 24 is supplied with the supply voltage 25.

Figure 2:
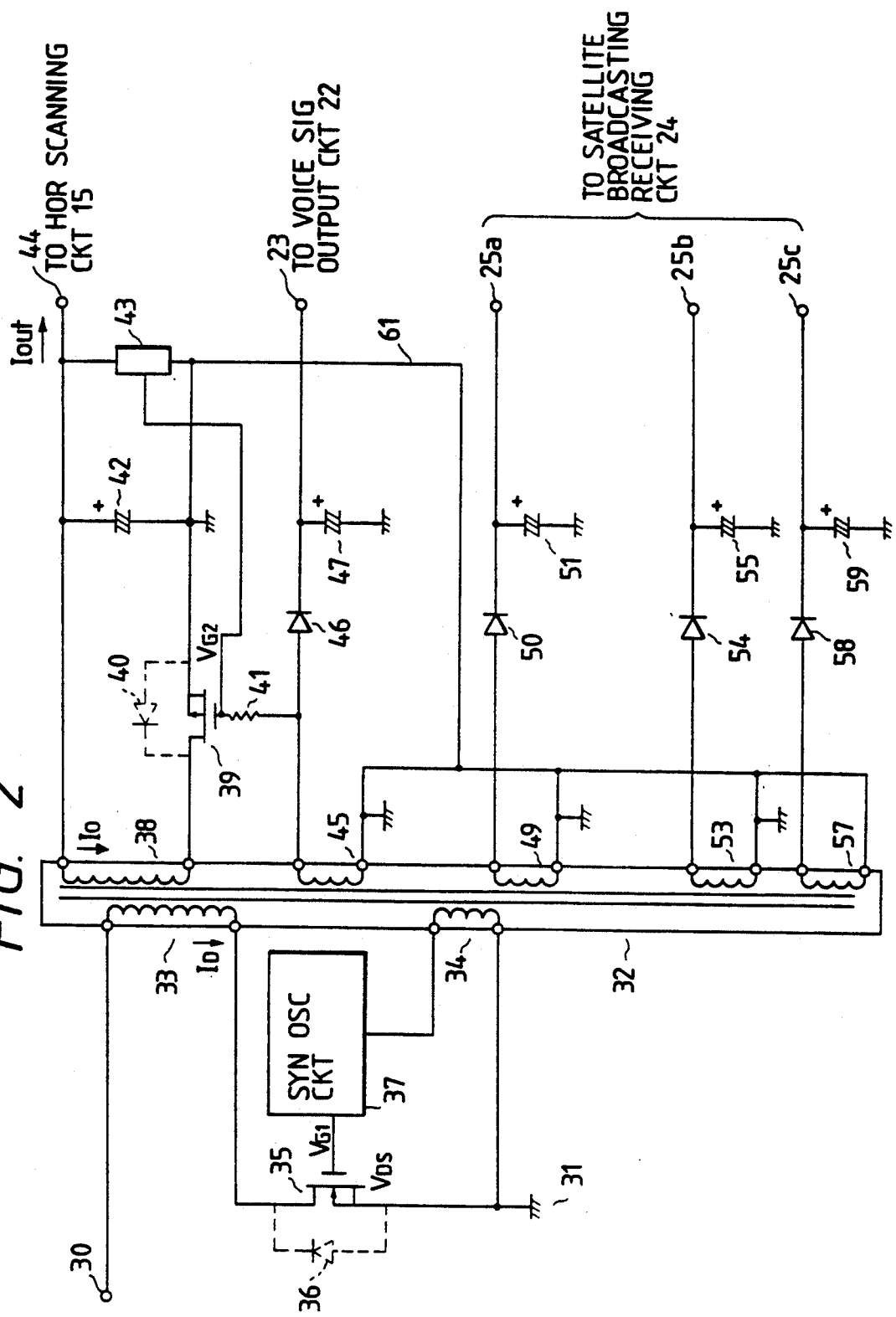
FIG. 2 is a schematic circuit diagram of the regenerative type of the switching power supply used in all embodiments of this invention.

Operation of the switching power supply 26 using the regenerative control system will be described. FIG. 2 is a schematic circuit diagram of the switching power supply 26 used in all embodiments of this invention. An input terminal 30 receives the supply voltage from the rectifying circuit 27 shown in FIG. 1. Thus, a primary current $I_D$ flows from the input terminal 30 to an earth terminal 31 through a primary winding 33 and a switching element 35 using a field effect transistor (hereinafter referred to as FET). The primary circuit of the switching power supply comprises the primary winding 33 of a transformer 32 and the switching element 35 connected in series with the primary winding 33, a body diode 36 parasitically included in the switching element 35 and the bias winding 34 whose one end is connected to a synchronous oscillating circuit 37 and another end is connected to the earth terminal 31. The body diode 36 included in the switching element is used for regenerating energy stored in the transformer 32 through the above-mentioned primary winding 33. That is, it is used to flow a regeneration current in the primary winding 33 when the switching element 35 is turned off. The synchronous oscillation circuit 37 for maintaining oscillation by repeating turning on and off such as to turn on the switching element 35 for a predetermined ON period and then, to maintain turning off until a polarity of the induced voltage of the above-mentioned bias winding 34 is inverted.

The secondary winding 38 of tile transformer 32 generates the power supply voltage 44 for the horizontal scanning circuit 15, whose one end is for outputting the supply voltage 44 and another end is connected to a switching element 39 using an FET in series. A body diode 40 is a parasitically produced which is associated with the switching element 39 and is connected in parallel with the switching element 39. A gate of the FET 39 is connected to a control circuit 43 and to the supply voltage 48 through a drive resistor 41 for the switching element 39.

Energy stored in the transformer 32 while the switching element 35 turns on, is released and charged in a smoothing capacitor 42 through the secondary winding 38 and through the body diode 40 or the above-mentioned switching element 39. Then, reversely, a secondary current flows from the smoothing capacitor 42 to the secondary winding 38 through the above-mentioned secondary winding 38, wherein a counter current period is controlled by the control circuit 43. The induced voltage in the secondary winding 38 is rectified by the body diode 40. The control circuit controls the counter current period for which the secondary current of the switching element 39 flows, by detecting a voltage between the supply voltage 44 and the earth terminal 61 and comparing it with a reference voltage. In addition to the secondary coil 38, the transformer 32 comprises a secondary windings 45, 49, 53, and 57. On end of the winding 45 is connected to a rectifying diode 46 in series. The output of the diode 46 is connected to a smoothing capacitor 47 in parallel. Thus, the supply voltage 23 for the voice signal output circuit is outputted from the junction point of the diode 46 and the smooth capacitor. The secondary winding 49, 53, and 57 are provided for supply voltages 52, 56, and 60 respectively, which are supplied to the satellite broadcasting receiver 24.

Figure 3:
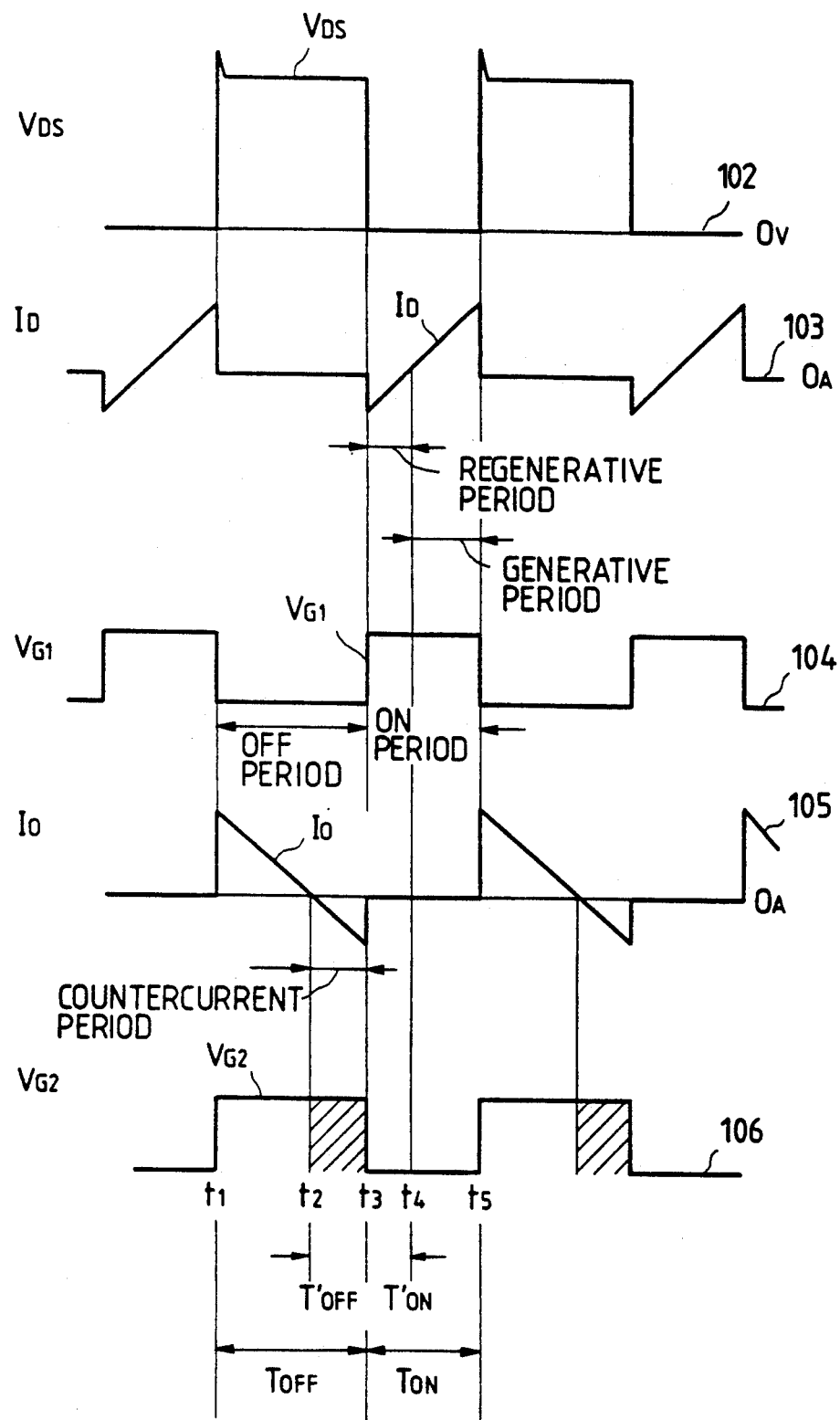
FIGS. 3 and 4 show waveforms of the regenerative type of power supply of the invention.

Hereinbelow will be described operation of the regenerative type of power supply of the invention with reference to FIG. 3. FIG. 3 shows waveforms of the regenerative type of power supply of the invention. In FIG. 3, an waveform 102 is of a voltage VDS between both ends of the switching element 35; an waveform 103 is of a primary current ID flowing through the above-mentioned primary winding 33; an waveform 104 is of a drive pulse VG1 of the synchronous oscillating circuit 37; an waveform 105 is of a secondary current waveform Io flowing though the above-mentioned secondary winding 38; an waveform 106 is of a drive pulse VG2 of the switching element 39 of the secondary circuit wherein periods denoted by slant lines out of OFF periods show the counter current periods for flowing a secondary current in the above-mentioned secondary winding 38. A primary current flowing through the primary winding 33 for an ON period of the switching element 35 which operates for the ON period determined by the synchronous oscillating circuit 37 generates a magnetic flux in the transformer 32 and thus, energy is accumulated. At this instance, an induced voltage is developed in the secondary winding 38 of the transformer 32. The secondary circuit is so formed that the body diode 40 is reverse-biased and the switching element 39 of the secondary circuit turns off. When the switching element 35 turns off by the OFF signal of the synchronous oscillation circuit 37, a flyback voltage is generated in the above-mentioned primary winding 33 as well as a flyback voltage is also developed in the winding 38 so as to apply to the body diode 40 in the form of forward-bias. It is followed by that the energy accumulated in the transformer 32 is released as a secondary current which is fed through the secondary winding 38 to the smoothing capacitor 42 which smooths it and provides the supply voltage 44. At this instance, the switching element 39 of the secondary circuit is turned on by the flyback voltage developed in the secondary winding 45 which is applied thereto through the drive resistor 41. However, it does not produce a special difference in operation whichever the secondary current flows through the body diode 40 or the switching element 39 as an FET. When all energy accumulated in the transformer 32 is released, so that the secondary current becomes zero, the voltage between the smoothing capacitor 42, i.e., supply voltage 44 is applied to the secondary winding 38 through the switching element 39 of the secondary circuit, which has been turned on. It is followed by that the smoothing capacitor produces a reverse current, so that an energy is accumulated in the transformer 32 with a magnetic flux having a direction opposite to the magnetic flux developed by the primary current ID flowing through the primary winding 33. In this condition, a polarity of an induced voltage developed in each of windings of the transformer 32 does not change, so that the flyback voltage of the bias winding 34 also does not change. Thus, the synchronous oscillation circuit 37 maintains the OFF period of the switching element 35. The ON period of the switching element 39 of the secondary circuit is controlled by the control circuit 43. When the switching element 39 of the secondary circuit turns off, the polarity of the induced voltage generated in each of windings of the transformer 32 is inverted, so that the induced voltage developed in the above-mentioned secondary winding 38 makes the body diode 40 biased in reverse. Moreover, the switching element 39 also turns off, so that the secondary winding current stops flowing. Then, the induced voltage developed in the above-mentioned primary winding 33 is so generated to cause a Junction terminal of the switching element 35 to have a negative voltage and to make a junction terminal of the supply voltage 30 to have a positive voltage. Thus, a primary current flows in the direction such that it charges the supply voltage 30 through the body diode 36, so that energy accumulated in the transformer 32 for the OFF period is regenerated in the supply voltage 30. At this instance, a polarity of the induced voltage in the bias winding 34 is also judged, so that the synchronous oscillation circuit 37 turns on the switching element 35. However, it does not effect on operational characteristic whichever the primary current flows through either one, namely, through the switching element 35 or body diode 36. When the energy accumulated in the transformer 32 for OFF period is released entirely and the primary current becomes zero, a magnetic flux is generated in the transformer 32 and the energy is accumulated there because a primary current flows from the supply voltage 30 through the switching element which has been turned on such that a discharging in the direction opposite to the former is carried out. In this condition, a polarity of an induced voltage in each of windings of the transformer 32 does not change, so that the switching element 35 maintains the ON state. When the switching element 35 which operate for the ON period determined by the synchronous oscillation circuit 37 turns off, the energy stored in the transformer 32 is released as a secondary current through the above-mentioned secondary winding 38. Repetition of these operations provides continuous supply of the supply voltage 44. Moreover, secondary windings 45, 49, 53, and 57 of multi-output type windings, these windings 45, 49, 53, and 57 being separated each other, are provided for a multi-output structure in this embodiment. In the supply voltage 48, one of those output voltages, a flyback voltage is generated in the secondary winding 45 when the switching element 35 turns off, it is applied to the rectifying diode 46 with forward biasing, so that a current flows through the rectifying diode 46 by energy stored in the transformer 32 and is smoothed by the smoothing capacitor 47 to output it. Operations at this instance in other secondary windings 49, 53, and 57 are the same as each other, so that a description is omitted.

Moreover, will be described operation of controlling output voltages 44, 48, 52, 56, and 60 stable. FIG. 3 shows each of waveforms of output voltage in operation. It is assumed that the OFF period (t1-t3) of the drive pulse VG1 generated by the synchronous oscillation circuit 37 is TOFF; in this period, the counter current period (t2-t3) of the secondary current $I_o$ is T'OFF; an ON period (t3-t5) is TON; in this period, a regeneration period (t3-t4) of the primary current ID is T'ON.

The TOFF is constant and the oscillation frequency f is also constant if the output voltage, the output voltage 44, for example, is constant because the ON period TON is retained to be a constant value determined by the synchronous oscillation circuit 37. On the other hand, the counter current period T'OFF can be changed by the switching element 39 of the secondary circuit, which is controlled by the control circuit 43. Thus, the output voltage can be controlled by changing the current period T'OFF when the output current Iout changes. Further, against change of the supply voltage 30 as input voltage, the supply voltage 44 as the output voltage Vout is controlled to be continuously constant by changing the counter current period T'OFF. The control circuit 43 controls the ON period of the switching element 39 of the secondary circuit to determine the counter current period T'OFF.

Figure 4:
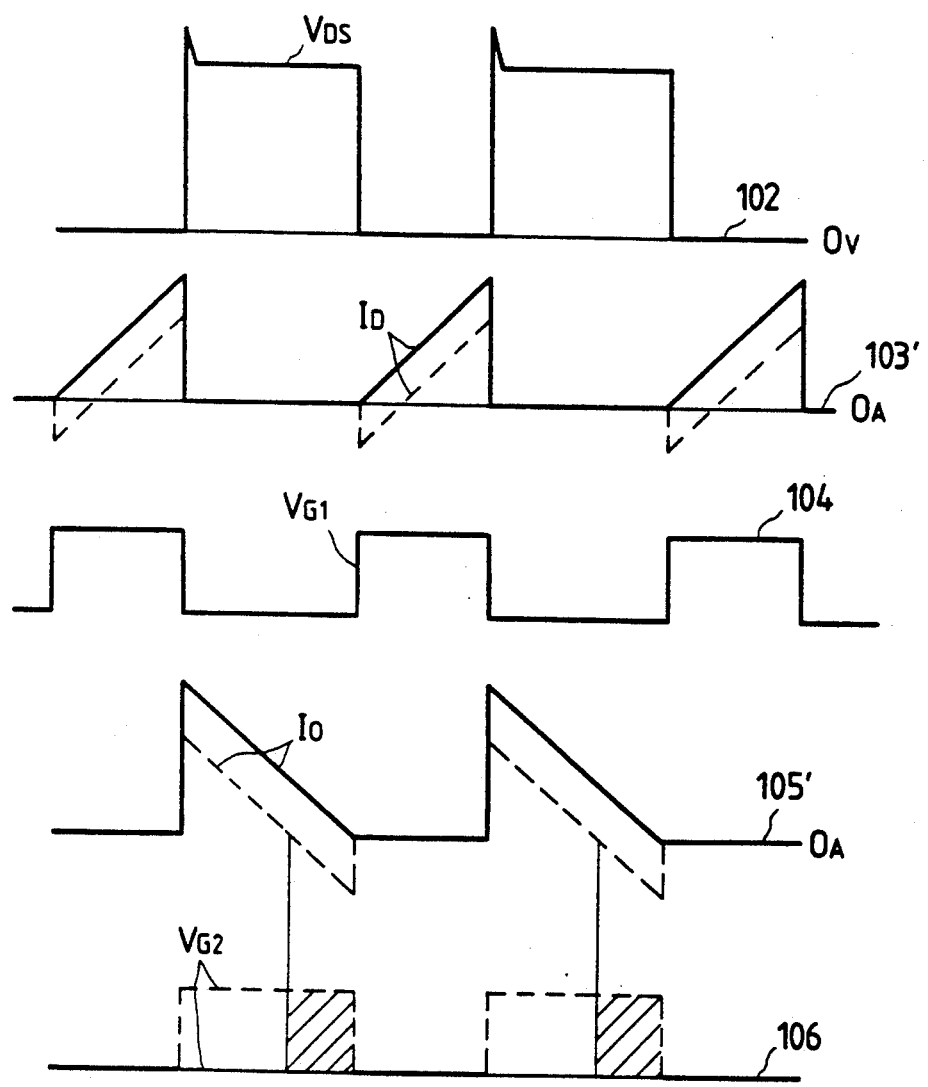

FIG. 4 shows each of operational waveforms of the regenerative type of the switching power supply 11 when the output current Iout changes. Some waveforms out of the waveforms shown in FIG. 4 are the same as those of FIG. 3 and thus, description about such waveforms are omitted. In FIG. 4, solid lines show the output current Iout flows with the maximum value, i.e., that of maximum load. Chain lines shows the case of that the output current is zero, i.e., unloaded condition.

Figure 5:
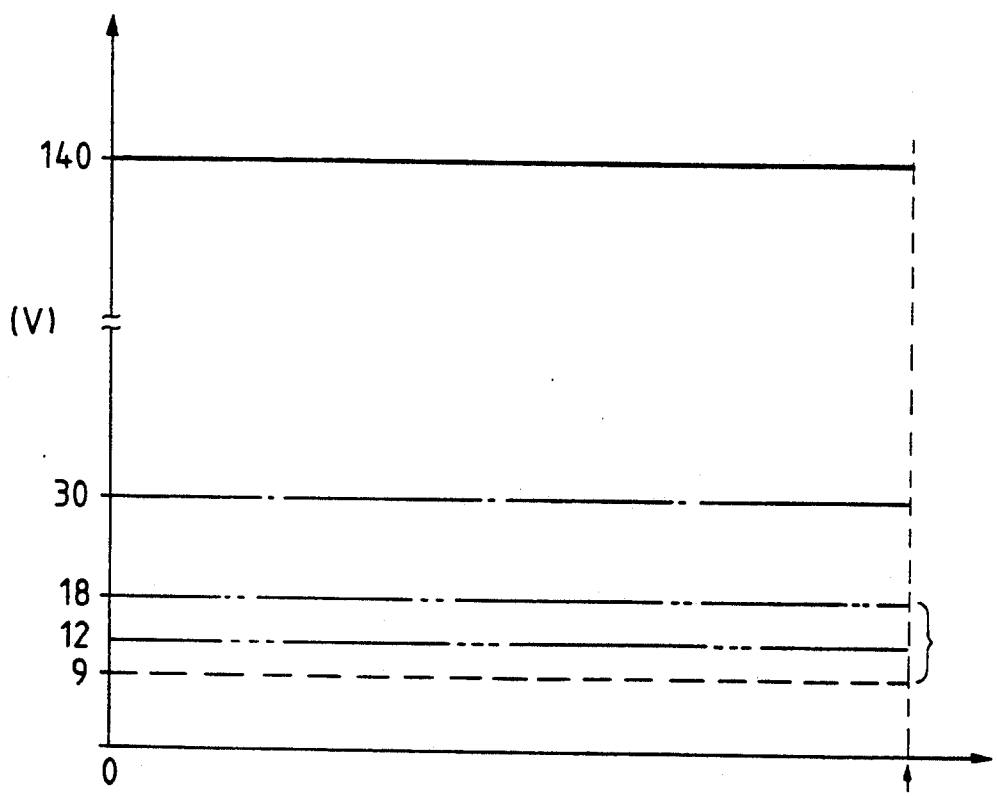
FIG. 5 shows an output voltage characteristic of the regenerative type of the switching power supply of the invention with respect to change of a load.

FIG. 5 shows an output voltage characteristic of the regenerative type of the switching power supply of the invention with respect to change of a load. The axis of ordinate is the secondary output voltage and respective values correspond supply voltages 48, 52, 56, and 60. The axis of abscissas shows a total of load electric power taken from the secondary circuit. As shown in FIG. 5, the output voltage is constant over a rang from no load to the maximum load.

Figure 6:
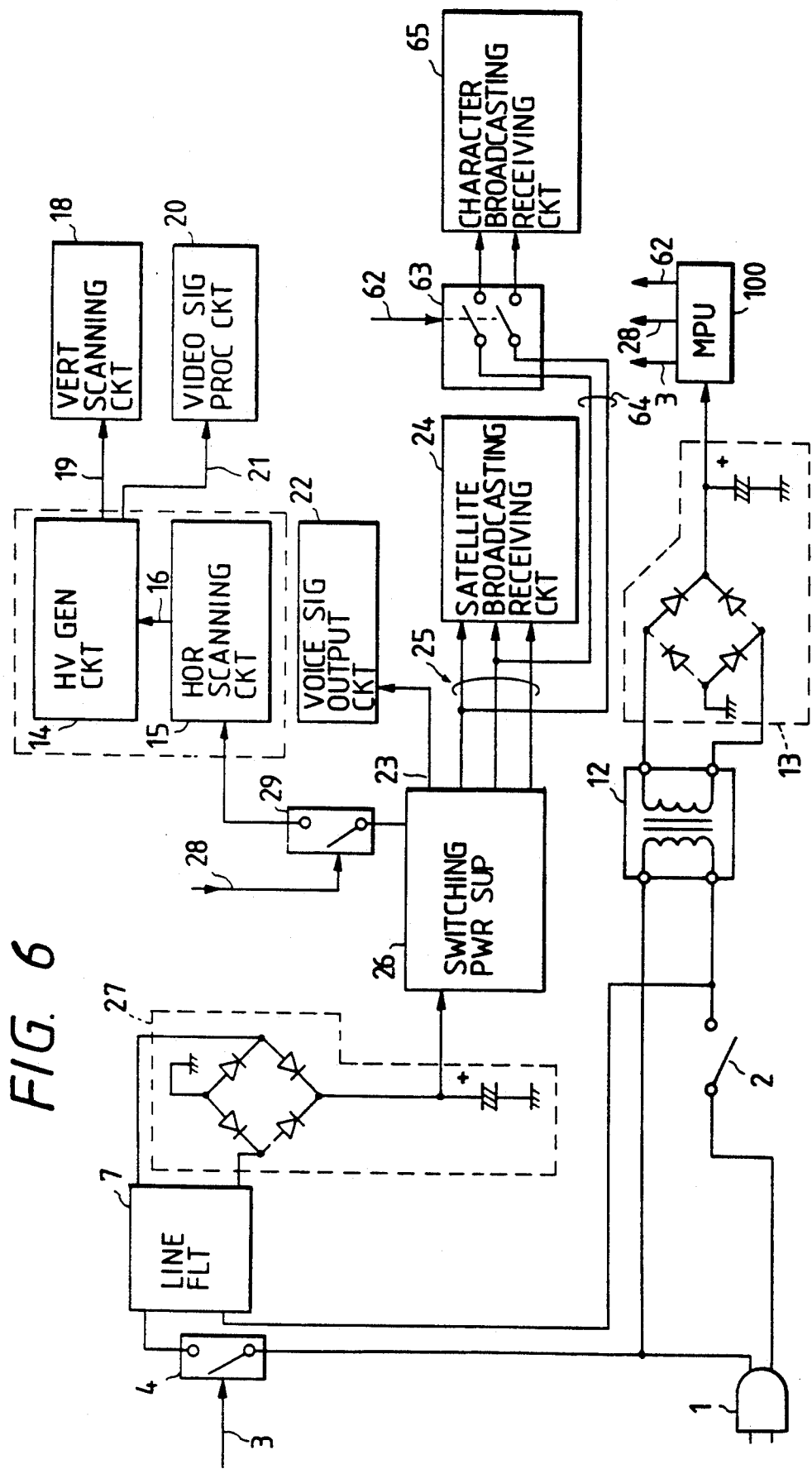
FIG. 6 is a block diagram of a second embodiment of a television receiver set including the regenerative type of power supply.

Hereinbelow will be described a second embodiment of the invention of the power supply apparatus for the television receiver set and the television receiver set having the power supply apparatus. FIG. 6 is a block diagram of a second embodiment of the television receiver set having the power supply apparatus. The structure of the second embodiment is the same as that of the first embodiment basically. There are differences that a character broadcasting receiving circuit 64 and a switch circuit 63 are added to the structure shown in FIG. 1. The switch circuit 63 is controlled by a control signal 62 from the microprocessor 100 and is provided between the character display broadcasting receiving circuit 64 and the supply voltage 64 from the supply voltage 25. The supply voltage 64 is obtained by branching off the supply voltages 25a and 25b.

Operation of the automatic recording of the satellite broadcasting is performed as similar to the structure of FIG. 1 basically. In addition to this, the user gives the microprocessor 100 a command for selecting whether the supply voltage 64 is supplied to the character display broadcasting receiving circuit 65 by turning on or off the switch circuit 63. This causes stop of the circuits 14, 15 18, 20, and 22 for displaying in the absence of the user and operation of only the character broadcasting receiving circuit 65 which stores the content of a given character broadcasting in its memory (not shown). Thus, the user can watch it by reproducing with the memory at a desired time.

In this structure, the user can effect automatic recording of the above-mentioned satellite broadcasting and character broadcasting by selection from either the condition that only the satellite broadcasting receiving circuit 24 operates or the condition that both the satellite broadcasting receiving circuit 24 and the character broadcasting receiving circuit 65 are in operating. That is, in this structure, it is impossible to operate only the character broadcasting receiving circuit 65.

Figure 7:
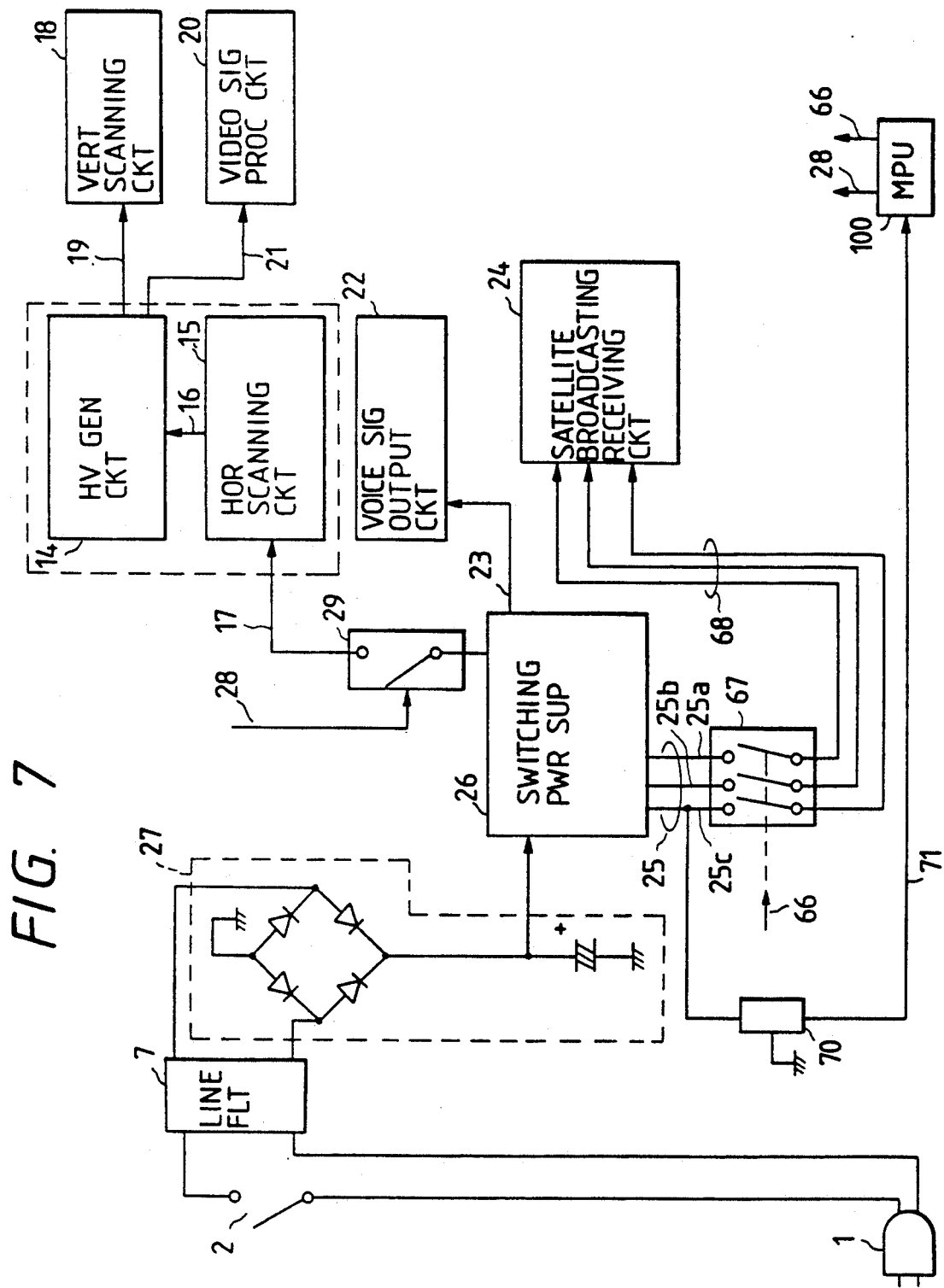
FIG. 7 is a block diagram of a third embodiment of a television receiver set including the regenerative type of power supply.

Hereinbelow will be described a third embodiment of the invention with reference to FIG. 7. FIG. 7 is a block diagram of the third embodiment of the power supply apparatus for the television receiver set and the television receiver set having the power supply apparatus. The structure of the third embodiment is the same as that of the first embodiment basically. There are differences that a switch circuit 67 are added to the structure shown in FIG. 1 and the remote transformer 12 and rectifying circuit 13 are replaced with a three-terminal regulator (dc-dc converter) 70. The switch circuit 67 is provided between the switching power supply 26 and the satellite broadcasting receiving circuit 24. The three-terminal regulator 70 is connected to the supply voltage 25a which is one of supply voltages of the switching regulator 26. The three-terminal regulator 70 generates a supply voltage 71 for the microprocessor 100 as a standby supply voltage.

Operation of the power supply apparatus having the above-mentioned structure and the television receiver set will be described with reference to FIG. 7.

At, first, will be described a condition that all circuits are operated and the television receiver set displays pictures. When the main switch 2 is closed, the ac voltage is supplied to the rectifying circuit 27 produces a dc voltage and the switching power supply 26 starts its operation. Then, the supply voltage 25c is outputted from the switching power supply 26 and thus, the three-terminal regulator 70 supplies a standby supply power 71 to the microprocessor 100 which starts its operation thereby. In this condition, if the user of the television selects watching the television, the control signals 28 and 66 are so produced as to close both switch 29 and 67. The switching power supply 26 has produced its output at its secondary circuit already. Then, the switching power supply 26 supplies the supply voltage 17, the supply voltage 23, and the supply voltage 25 to the horizontal scanning circuit 15, the voice signal output circuit 22, and the satellite broadcasting receiving circuit 24 respectively as shown in FIG. 7. Thus, all circuits in the television for displaying image pictures and outputting voice sounds operate, so that the television receiver set is in a condition that the user can watch programs of the ordinal television broadcasting and the satellite broadcasting at will.

Operation of an automatic recording of a program of the satellite broadcasting carried out from the above-mentioned condition is the same as that of the first and second embodiments, so that detailed description is omitted.

Hereinbelow will be described the standby condition of the microprocessor 100. The standby condition is that only the microprocessor 100 operates as a load of the power supply 26. In this condition the user can selects watching of the television with the remote controller (not shown).

When the user sends to the television a command for automatic recording with the remote controller (not shown) or by a keyboard (not shown) on the front of the television receiver set, in response to the command, the microprocessor 100 outputs the control signals 28 and 66 so as to open the switches 29 and 67. If the standby condition is started from the condition that automatic recording has carried out, the microprocessor 100 outputs only the control signal 66 to turn off the satellite broadcasting receiving circuit 24. Then, the switching power supply 26 continues operation and output of each of supply powers. However, the supply voltage 17 is not supplied to the horizontal scanning circuit 15, so that the flyback pulse 16 is not generated and the high voltage generation circuit 14 stops operation. This causes the supply voltages 19 and 21 are not supplied to the vertical scanning circuit 18 and the video signal processing circuit 20 respectively from the secondary circuit of the flyback transformer of the high voltage generation circuit 14. That is, the television portion does not display pictures and the satellite broadcasting receiving circuit also does not operates. Therefore, the switching power supply 26 supplies only supply power 71 to the microprocessor 100 through the three-terminal regulator 70. This establishes the standby condition.

Figure 8:
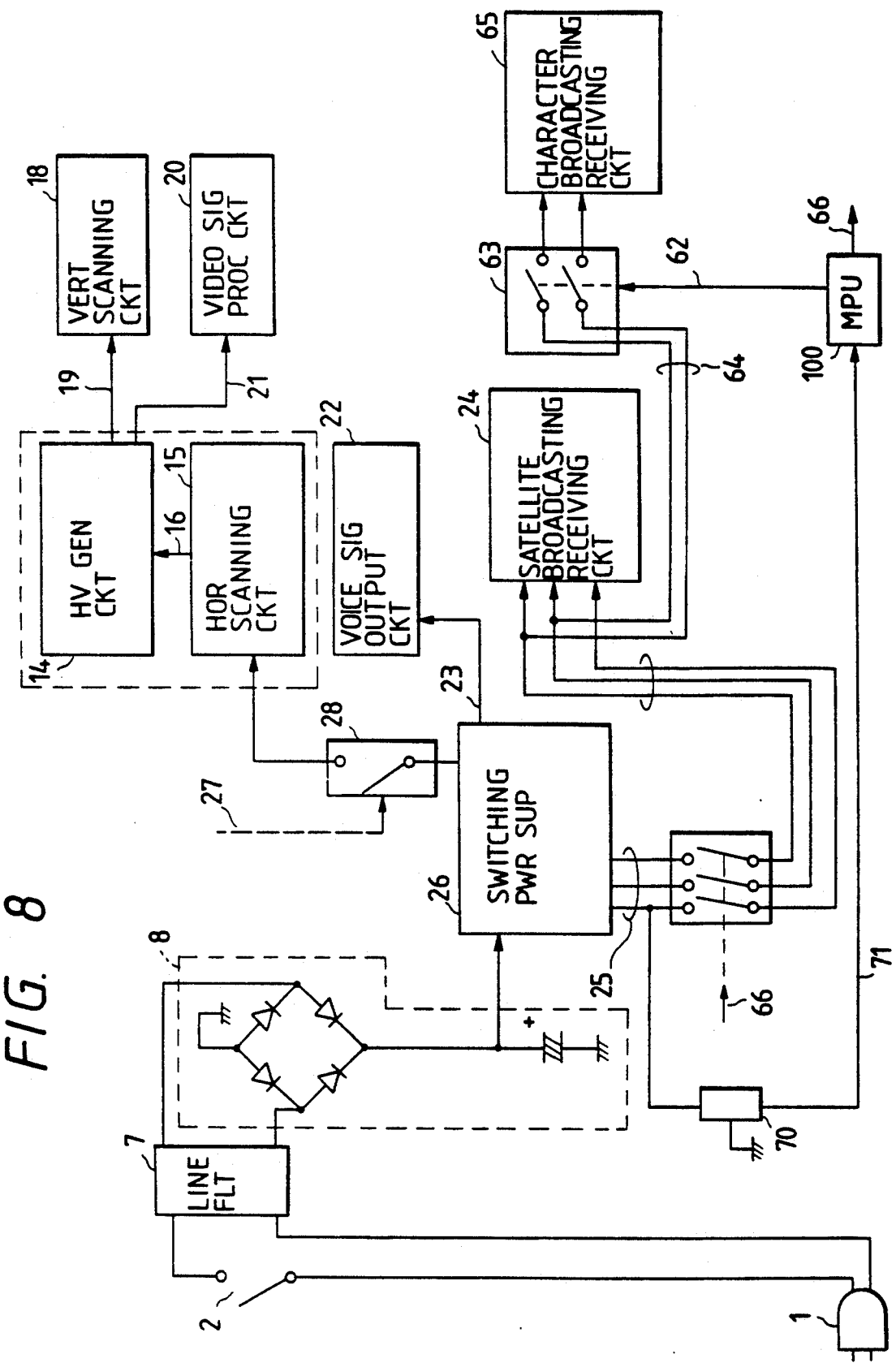
FIG. 8 is a block diagram of the fourth embodiment of a television receiver set including the regenerative type of switching power supply.

Hereinbelow will be described a fourth embodiment of the invention. FIG. 8 is a block diagram of the fourth embodiment of the power supply apparatus for the television receiver set and the television receiver set having the power supply apparatus. The structure of the fourth embodiment is the same as that of the third embodiment basically. There are differences that a character broadcasting receiving circuit 65 and a switch circuit 63 are added to the structure shown in FIG. 8. The switch circuit 63 is controlled by a control signal 62 from the microprocessor 100 and is provided between the character display broadcasting receiving circuit 64 and the supply voltage 64 from the supply voltage 25. The supply voltage 64 is obtained branching off the supply voltages 25a and 25b.

Operation of the automatic recording of the satellite broadcasting is established as similar to the structure of FIG. 7. In addition to this, the user gives the microprocessor a command for selecting whether the supply voltage 64 is supplied to the character display broadcasting receiving circuit 71 on or not by turning on or off the switch circuit 65. This causes stop of the circuit for displaying during the absence of the user and causes operation of the character broadcasting receiving circuit 65 by storing the content of a given character broadcasting program in the memory (not shown) of the character broadcasting receiving circuit 65. Thus, the user can watch it at a desired time. Moreover, description about transition to the standby condition is omitted because it is the same as that of the third embodiment of FIG. 7. Further, in this structure, the user can effect automatic recording of the above-mentioned satellite broadcasting and character broadcasting with selection from either the condition that only the satellite broadcasting receiving circuit 24 operates or the condition that both the satellite broadcasting receiving circuit 24 and the character broadcasting receiving circuit 65 are in operating. In other words, in this structure, it is impossible to operate only the character broadcasting receiving circuit 65. However, it is also possible that only the character broadcasting receiving circuit 65 operates, if the circuit positions of the satellite broadcasting receiving circuit 24 and the character broadcasting receiving circuit 65 in the block diagram of FIG. 8 are replaced with each other. Moreover, if both of the satellite broadcasting receiving circuit 24 and character broadcasting receiving circuit 65 can be operated if two power supply systems are provided to the switching power supply 26 and connected to the satellite broadcasting receiving circuit 24 and the character broadcasting receiving circuit 65 respectively.

In the above-mentioned third and fourth embodiments, the microprocessor 100 is supplied with a standby supply through the three-terminal regulator 70. However, if one of supply voltages matches to the microprocessor 100 in voltage intensity, it can be supplied to the microprocessor 100 directly.

In the above-mentioned embodiments, controlling of supplying of supply voltages 17, 23, 25, 64, and 68 is carried out under control of the microprocessor. However, it is also possible to control supplying of these supply voltages 17, 23, 25, 64, and 68 by a manual operational switch.

As mentioned above, according to this invention, the power supply apparatus is realized with only one system contrary to the prior art switching power supply apparatus, so that there are provided advantageous effects that the mounting area for the power supply apparatus can be reduced to about half and reduce its cost.

What is claimed is:

1. A power supply apparatus for a television receiver set including a television circuit means and broadcasting receiving circuit means for receiving broadcasting whose type is different from that of said television circuit means, comprising:
   (a) a regenerative type of switching power supply for producing a plurality of supply voltages whose intensities are different from each other; and
   (b) switch means for controlling of supplying of a first supply voltage out of said supply voltages to said television circuit means in response to a control signal, wherein said broadcasting receiving circuit means comprises satellite broadcasting receiving means and a second supply voltage out of said supply voltages is supplied to said satellite broadcasting receiving means.

2. A power supply apparatus for a television receiver set as claimed in claim 1, further comprising second switching means and,
wherein said broadcasting receiving circuit means further comprises character broadcasting receiving means; a third supply voltage out of said supply voltages is supplied to said character broadcasting receiving means; and said second switching means controls supplying of said third supply voltage to said character broadcasting receiving means in response to a second control signal.

3. A power supply apparatus for a television receiver set as claimed in claim 1, further comprising control means for producing said control signal in response to an external command and,
wherein any one of said supply voltages is supplied to said control means and said any one of said supply voltages is supplied continuously.

4. A power supply apparatus for a television receiver set as claimed in claim 3, further comprising a dc-dc converting means, provided between said power supply and said control means, for changing a voltage intensity of said any one of said supply voltages to another voltage intensity necessary for said control means.

5. A power supply apparatus for a television receiver set as claimed in claim 1, further comprising second switching means and, wherein said second switching means controls supplying of said second supply voltage to said satellite broadcasting receiving means in response to a second control signal.

6. A power supply apparatus for a television receiver set as claimed in claim 5, further comprising third switching means and, wherein said broadcasting receiving circuit means further comprises character broadcasting receiving means; a third supply voltage out of said supply voltages is supplied to said character broadcasting receiving means; and said third switching means controls supplying of said third supply voltage to said character broadcasting receiving means in response to a third control signal.

7. A power supply apparatus for a television receiver set as claimed in claim 6, further comprising control means for producing said first, second, and third control signals in response to an external command and,
wherein any one of said supply voltages is supplied to said control means and said any one of said supply voltages is supplied continuously.

8. A power supply apparatus for a television receiver set as claimed in claim 7, further comprising a dc-dc converting means, provided between said power supply and said control means, for changing a voltage intensity of said any one of said supply voltages to another voltage intensity necessary for said control means.

9. A power supply apparatus for a television receiver set including a television circuit means and broadcasting receiving circuit means for receiving broadcast programs whose type is different from that of said television circuit means, comprising:
(a) a regenerative type of switching power supply having a primary circuit for receiving an input supply voltage and a plurality of secondary circuits for respectively producing a plurality of supply voltages whose intensities are different from each other; and
(b) switch means for controlling of supplying of a first supply voltage out of said plurality of supply voltages to said television circuit means in response to a control signal,
wherein said broadcasting receiving circuit means comprises satellite broadcasting receiving means and a second supply voltage out of said supply voltages is supplied to said satellite broadcasting receiving means.

10. A power supply apparatus for a television receiver set as claimed in claim 9, further comprising second switching means, and
wherein said broadcasting receiving circuit means further comprises character broadcasting receiving means, a third supply voltage out of said supply voltages is supplied to said character broadcasting receiving means, and said second switching means controls supplying of said third supply voltage to said character broadcasting receiving means in response to a second control signal.

11. A power supply apparatus for a television receiver set including a television circuit means and broadcasting receiving circuit means for receiving broadcasting whose type is different from that of said television circuit means, comprising:
(a) a regenerative type of switching power supply having a primary circuit and a plurality of secondary circuits for producing a plurality of supply voltages from an input DC supply, said plurality of supply voltages having different intensities, said primary circuit and one of said plurality of secondary circuits including regenerative means for returning a portion of a power received from said input DC supply to said input DC supply in accordance with a load of said one of said plurality of secondary circuits; and
(b) switch means for controlling of supplying of a first supply voltage out of said supply voltages to said television circuit means in response to a control signal,
wherein said broadcasting receiving circuit means comprises satellite broadcasting receiving means and a second supply voltage out of said supply voltages is supplied to said satellite broadcasting receiving means.

12. A power supply apparatus for a television receiver set as claimed in claim 11, further comprising second switching means, and
wherein said broadcasting receiving circuit means further comprises character broadcasting receiving means, a third supply voltage out of said supply voltages is supplied to said character broadcasting receiving means, and said second switching means controls supplying of said third supply voltage to said character broadcasting receiving means in response to a second control signal.

13. A television receiver set comprising:
television circuit means for controlling video outputs of the television set;
broadcasting receiving means for controlling reception of satellite broadcasting transmissions;
a switching power supply of a regenerative type for receiving an input power and producing a plurality of supply voltages having different voltages in order to provide a first supply voltage to said television circuit means and a second supply voltage to said broadcasting receiving means;
a control means for outputting a plurality of control signals to control said plurality of supply voltages being supplied to at least said television circuit means; and a first switch provided between said switching power supply and said television circuit means, said first switch allowing said first supply voltage of said switching power supply to be supplied to said television circuit means in response to one of said plurality of control signals from said control means.

14. The television receiver set of claim 13, wherein said control means is coupled to the external power source to receive a standby power supply.

15. The television receiver set of claim 13, wherein said control means is coupled to said switching power supply to continuously receive any one of said plurality of supply voltages.

16. The television receiver set of claim 15 further comprising a dc-dc converting means, provide between said switching power supply and said control means, for changing any one of said plurality of supply voltages to another voltage necessary for control means.

17. The television receiver set of claim 13, further comprising a second switch provided between said switching power supply and said broadcasting receiving means, said second switch allowing said second supply voltages of said switching power supply to be supplied to said broadcasting receiving means in response to one of said plurality of control signals from said control means.

18. The television receiver set of claim 13 further comprising a character broadcasting receiving circuit and a third switch coupled between said character broadcasting receiving circuit and said switching power supply, said switching power supply providing a third supply voltage to said character broadcasting receiving circuit and said third switch allowing said third supply voltage to be supplied to said character broadcasting receiving circuit in response to one of said plurality of control signals from said control means.

19. The television receiver set of claim 13 further comprising voice signal output circuit for controlling audio outputs of the television set, said switching power supply providing a fourth supply voltage to said voice signal output circuit.

20. The television receiver set of claim 19, wherein said television circuit means comprises:

a horizontal scanning circuit for controlling horizontal scanning of an electron beam, said horizontal scanning circuit receiving said first voltage and generating flyback pulses;

a high voltage generation circuit coupled to said horizontal scanning circuit to receive said flyback pulses and generating a first high voltage supply voltage and a second high voltage supply voltage;

a vertical scanning circuit for controlling vertical scanning of the electron beam coupled to said high voltage generation circuit to receive said first high voltage supply voltage; and a video signal processing circuit for converting a transmission signal into a video signal to reproduce an image, said video signal processing circuit being coupled to said high voltage generation circuit to receive said second high voltage supply voltage.

21. The television receiver set of claim 13, wherein said switching power supply comprises:

a primary circuit for receiving the input power; and a plurality of secondary circuits for producing said plurality of supply voltages from the input power.

* * * * *